United States Patent Office 3,057,077
Patented Oct. 9, 1962

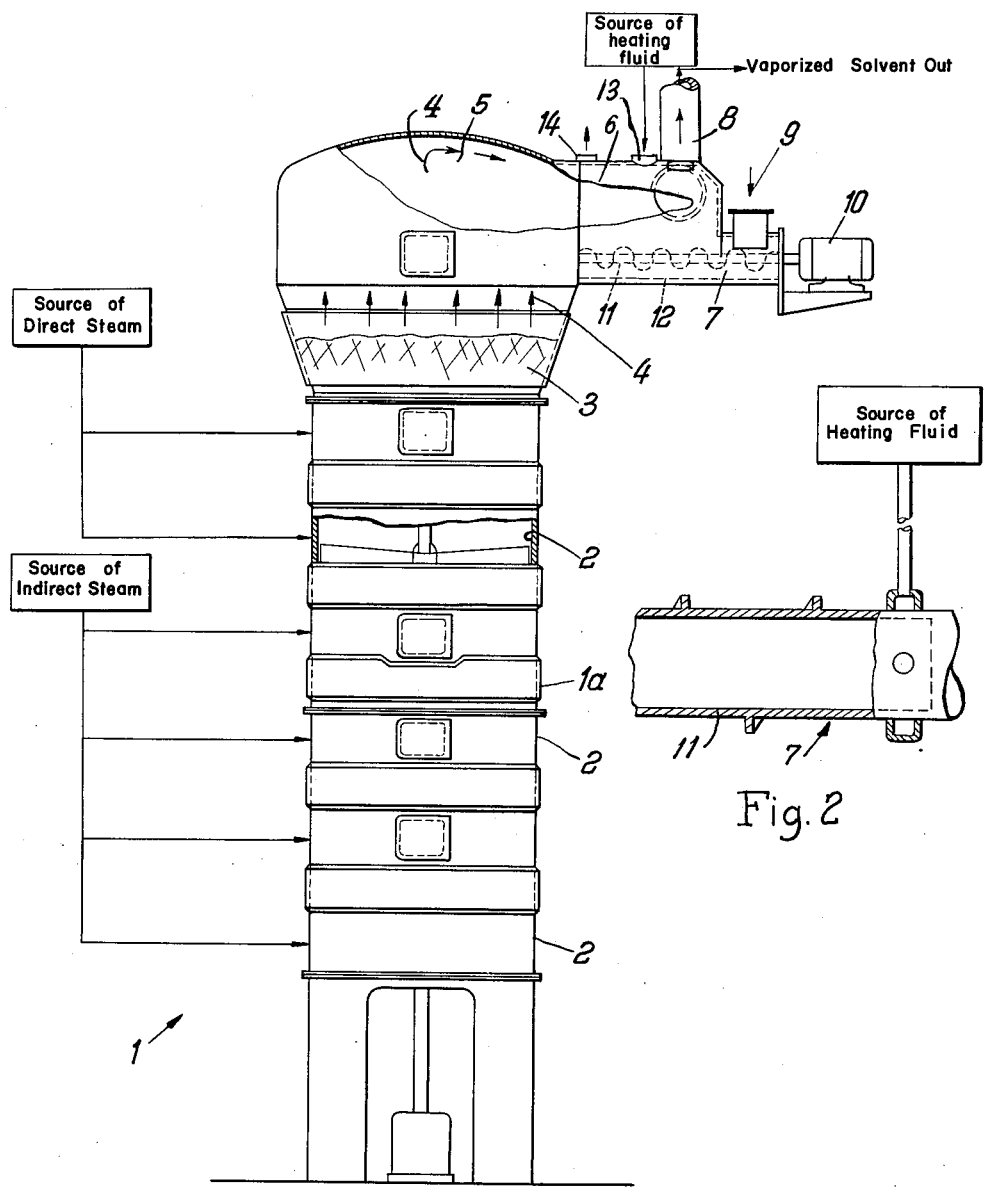

3,057,077
METHOD OF AND APPARATUS FOR SEPARATING SOLIDS FROM SOLVENT VAPORS
Wilhelm Depmer, Hochalle 45, Hamburg 13, Germany
Filed Jan. 22, 1959, Ser. No. 788,467
Claims priority, application Germany Jan. 22, 1958
5 Claims. (Cl. 34—32)

The present invention relates to a method of and an apparatus for stripping solvent-extracted solid residues obtained in a solvent extraction system from residual solvent adhering thereto, and more particularly to a method of and to an apparatus for separating solid residues entrained by solvent vapors discharged from desolventizing toasters in such systems.

In stripping solid residues in a solvent extraction system, for example, in stripping benzine-containing, extracted soybean meal or the like, it is customary to utilize agitators, also known as toasters or desolventizer-toasters, which bring about not only a cooking of the residues but also a simultaneous transformation of the protein. Known toasters consist of superimposed independent but connected closed compartments or chambers which are received in an upright housing or tank, the fresh solvent-containing residues from which the solvent is about to be extracted being led from the uppermost toward and into the next-lower compartments. Direct steam is introduced into the uppermost part of the toaster in order to vaporize the solvent and to raise the moisture contents of the residues to a certain value. The lower compartments or chambers are indirectly heated by the steam to bring about a cooking and toasting of the residues.

It has been found that solid residues in such prior toasters are often entrained by the upwardly ascending vapors consisting of a mixture of water vapors and solvent vapors to enter with the latter various treating stations where the recovery of solvent is completed, i.e. the washing and condensing apparatus. The disadvantage of such systems is that the solid particles entrained by the ascending vapor mixture settle in and thus contaminate the condenser.

An important object of the present invention is to provide a method of removing residual solvent from extracted residues of a solvent extraction system according to which the solid particles are prevented from leaving the stripper-toaster and are thus prevented from entering the condensing station in which the solvent is recovered from vapors discharged from the toaster.

Another object of the invention is to provide a method of separating solvent vapors from solid residues in solvent extraction systems according to which the solid residues entrained by the ascending mixture of solvent vapors and water vapors are returned into the toaster by the newly introduced fresh, solvent-containing, extracted residues.

A further object of the invention in to provide an improved apparatus for the practice of my novel method.

A still further object of the invention is to provide a novel aparatus for use in solvent-extraction systems which is so constructed that the condensation of solvent in the solvent vapor discharge lines is prevented.

The above and certain other objects of the invention are attained by the provision of a method according to which the solvent vapors ascending from the desolventizer toaster are deflected through an angle of preferably about 90 degrees with respect to the vertical axis of the toaster whereby the solid particles entrained by the vapors are caused to impinge against a baffle and are separated from the vapors. According to another feature of my invention, the vapors are caused to intimately contact the newly introduced fresh solvent-wet residues while advancing at an angle of about 90 degrees with respect to the axis of the toaster.

The aforementioned vapor deflecting means or baffles may assume a number of different shapes. For example, the dome or cover of the toaster and the conduit means connected to the cover for leading the solvent vapors from the toaster may be utilized as a means for separating the entrained dust-like particles of the solids from the solvent vapors. In such instances, the conduit means is substantially horizontal, i.e. disposed at right angles to the vertical axis of the toaster.

It has been found that a very satisfactory separation of solid residues from solvent vapors can be achieved if the means for feeding fresh solvent-containing extraction residues, e.g. a feed screw or the like, is installed in the conduit means through which the solvent vapors are led from the toaster. In this manner, any residues entrained by the solvent vapors are caused to mix with the newly introduced fresh solvent-containing, extracted material while the latter is in contact with the vapors to reenter the stripper toaster. For example, the conduit means through which the solvent vapors are led from the toaster may assume the form of an aspirating tube, i.e. the feed screw is disposed in the bottom zone of such conduit means. According to a modification of my invention, the feed screw may operate as a mixer in order to intermingle the newly introduced fresh solvent-containing residues with the dust-like particles of solid rseidues entrained by the mixture of solvent vapor and water vapor.

The conduit means for discharging the vapors from the toaster may be formed with a twin jacket defining a space for the circulation of a heating medium, e.g. steam, which prevents condensation of solvent in the conduit means. As an alternative or in addition thereto, the shaft of the feed screw may be formed as a hollow body for circulation of steam or another heating medium therethrough to further reduce the likelihood of condensation of solvent in the vapor discharge conduit.

The partially cleaned solvent vapors discharged from the aforementioned conduit means are thereupon led to various washing and condensing stations of known design wherein the recovery of solvent is completed.

The novel features which are considered as characteristic of the invention are set forth in particular in the appended claims. The invention itself, however, both as to its construction and its method of operation, together with additional objects and advantages thereof, will be best understood from the following description of a specific embodiment when read in connection with the accompanying drawing, in which FIG. 1 is a schematic side elevational view of a stripper and toaster combined with means for preventing the discharge of solid residues with the solvent vapors; and FIG. 2 is a greatly enlarged fragmentary partly elevational and partly sectional view of a feed screw which forms part of the apparatus shown in FIG. 1.

The stripper-toaster or agitator 1 comprises an upright tubular housing 1a consisting of a series of vertically aligned superimposed chambers or compartments 2 in which the treatment of solvent-wet residues from the solvent extraction system takes place in known manner. The construction of this toaster by itself forms no part of my invention and may be such as described, for example, in U.S. Patent No. 2,585,793 granted on February 12, 1952 for "Soybean Treating Process." Thus, the uppermost compartment or compartments 2 may be heated by direct steam, and the remaining compartments may be heated indirectly.

At the upper end of agitator means or toaster 1, there is provided a compartment 3 containing a bed or layer of solid residues through which the vapors, i.e. a mixture of solvent vapors and water vapors, escape in upward direction indicated by arrows 4. The dome or cover 5 of toaster 1 constitutes a baffle in that it deflects the vapors through an angle of 90 degrees with respect to the vertical axis of the apparatus; thus, the vapors entering into the horizontal discharge conduit means 6 are deflected by dome 5 through ninety degrees from their original substantially vertical direction indicated by arrows 4. The conduit 6 houses in its lower zone a feed screw 7 (see also FIG. 2) which, as mentioned hereinabove, may operate as an aspirator or as a mixer.

Due to the deflection of ascending vapors from the direction of arrows 4 into a substantially horizontal direction, a certain percentage of solid residues entrained by the vapors is separated from the latter after impinging against the dome 5 to drop onto the bed or layer of residues in compartment 3. The remaining solids are separated from the solvent vapors in conduit means 6. Feed screw 7 causes the newly introduced fresh solvent-containing residues to mix with the remaining solids entrained by the vapors through conduit means 6 whereby the solids which become separated from the vapors are returned back into the toaster 1. Therefore, the vapors discharged from conduit 6 through a pipe 8 are practically free of solid residues and may be led to the various washing and condensing stations for recovery of solvent without the danger that the condenser would become contaminated with solid material.

New supplies of residual solvent-containing extraction residues are led into conduit 6 through a pipe 9 to be conveyed by the feed screw 7 in a direction toward the baffle or dome 5 and thence into the uppermost compartment 3 of toaster 1, i.e. in a direction counter to that in which the solvent vapors are led through the conduit means 6.

Feed screw 7 is driven by an electric motor 10, and its shaft 11 may be formed as a hollow body connected by a header with a source of steam or another heating medium (see FIG. 2) to prevent condensation of solvent in the conduit means 6. As an alternative or in addition thereto, conduit means 6 may be formed with an inner jacket 12 which latter defines with the outer jacket a space into which steam or other heating medium may be introduced through an inlet port 13 to circulate in said space and to be discharged through an outlet port 14. Steam circulating in the space between the jackets of conduit means 6 further reduces the likelihood of solvent condensation in the latter.

It will be understood that the inclination of the longitudinal axis of conduit means 6 with respect to the vertical axis of toaster 1 need not be exactly 90 degrees but may deviate therefrom within a wide range.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. The method of separating solid residues from vaporized solvent developing in desolventizing of solvent-wet solid residues in solvent extraction systems, comprising heating the solvent-wet solid residues to vaporize the solvent; guiding the vaporized solvent in a first direction; thereupon deflecting and guiding the vaporized solvent in a second direction whereby at least some solid residues entrained by the vaporized solvent while the latter is guided in said first direction are separated at the point of deflection into said second direction; contacting the vaporized solvent with fresh solvent-wet solid residues while the vaporized solvent is guided in said second direction whereby said fresh residues remove the remaining solid residues from the vaporized solvent; and heating the vaporized solvent while the vaporized solvent is guided in said second direction to prevent condensation thereof.

2. The method of separating solid residues from vaporized solvent developing in desolventizing of solvent-wet solid residues in solvent extraction systems, comprising heating the solvent-wet solid residues to vaporize the solvent; guiding the vaporized solvent in a first direction; thereupon deflecting and guiding the vaporized solvent in a second direction whereby at least some solid residues entrained by the vaporized solvent while the latter is guided in said first direction are separated at the point of deflection into said second direction; feeding fresh solvent-wet solid residues in a third direction counter to said second direction; heating said fresh solvent-wet residues while they are fed in said third direction; contacting said fresh solvent-wet solid residues with the vaporized solvent while the vaporized solvent is guided in said second direction whereby said fresh residues remove the remaining solid residues from the vaporized solvent; and heating the vaporized solvent while the vaporized solvent is guided in said second direction to prevent condensation thereof.

3. In a solvent extraction system, an apparatus for removing solid residues from vaporized solvent developing in desolventizing of solvent-wet solid residues, said apparatus comprising, in combination, an upright toaster comprising a plurality of superimposed compartments for the passage of solvent-wet solid residues from the uppermost compartment into the compartments disposed therebelow; means for heating the solvent-wet residues in said compartments to vaporize the solvent contained therein whereby the vaporized solvent ascends through said compartments and entrains solid residues in upward direction; substantially horizontal conduit means connected with said toaster above the uppermost compartment for guiding the vaporized solvent from the toaster whereby the vaporized solvent is deflected during entry into said conduit means and at least some solid residues are separated therefrom, said conduit means comprising a double jacket defining a heating space; a source of heating fluid connected with said space for admitting heating fluid into said jacket so as to prevent condensation of vaporized solvent in said conduit means; and means provided in said conduit means for feeding fresh solvent-wet solid residues into the uppermost compartment in such a way that the fresh solven-wet residues fed into said conduit means contact the deflected vaporized solvent and remove the remaining solid residues therefrom.

4. In a solvent extraction system, an apparatus for removing solid residues from vaporized solvent developing in desolventizing of solvent-wet solid residues, said apparatus comprising, in combination, an upright toaster comprising a plurality of superimposed compartments for the passage of solvent-wet solid residues from the uppermost compartment into the compartments disposed therebelow; means for heating the solvent-wet residues in said compartments to vaporize the solvent contained therein whereby the vaporized solvent ascends through said compartments and entrains solid residues in upward direction; substantially horizontal conduit means connected with said toaster above the uppermost compartment for guiding the vaporized solvent from the toaster whereby the vaporized solvent is deflected during entry into said conduit means and at least some solid residues are separated therefrom; a hollow feed screw provided in said conduit means for feeding fresh solvent-wet residues to the uppermost compartment; means for rotating said feed screw to advance the fresh residues through said conduit means whereby the fresh residues contact the vaporized solvent and remove the remaining solid residues therefrom; and means comprising a source of heating fluid connected with said feed screw for internally heating the same to prevent condensation of solvent in said conduit means.

5. In a solvent extraction system, an apparatus for removing solid residues from vaporized solvent developing in desolventizing of solvent-wet solid residues, said apparatus comprising, in combination, an upright toaster comprising a plurality of superimposed compartments for the passage of solvent-wet solid residues from the uppermost compartment into the compartment disposed therebelow, and a dome disposed above the uppermost compartment; means for heating the solvent-wet residues in said compartments to vaporize the solvent contained therein whereby the vaporized solvent ascends through said compartments and entrains solid residues in upward direction and impinges against said dome; substantially horizontal conduit means connected with said dome for guiding the vaporized solvent from the toaster whereby the vaporized solvent is deflected during entry into said conduit means and at least some solid residues are separated therefrom by said dome; and means provided in said conduit means for feeding fresh solvent-wet solid residues into the uppermost compartment in such a way that the fresh solvent-wet residues fed into said conduit means contact the deflected vaporized solvent and remove the remaining solid residues therefrom.

References Cited in the file of this patent

UNITED STATES PATENTS

| | | |
|---|---|---|
| 844,623 | Shiner | Feb. 19, 1907 |
| 1,057,912 | Adt | Apr. 1, 1913 |
| 1,139,664 | Geiger | May 18, 1915 |
| 1,611,098 | Borner | Dec. 14, 1926 |
| 1,775,313 | Lellep | Sept. 9, 1930 |
| 2,098,024 | Bailey | Nov. 2, 1937 |
| 2,895,231 | Sylvest | July 21, 1959 |

FOREIGN PATENTS

| | | |
|---|---|---|
| 207,585 | Germany | Mar. 4, 1909 |